Figure 1:
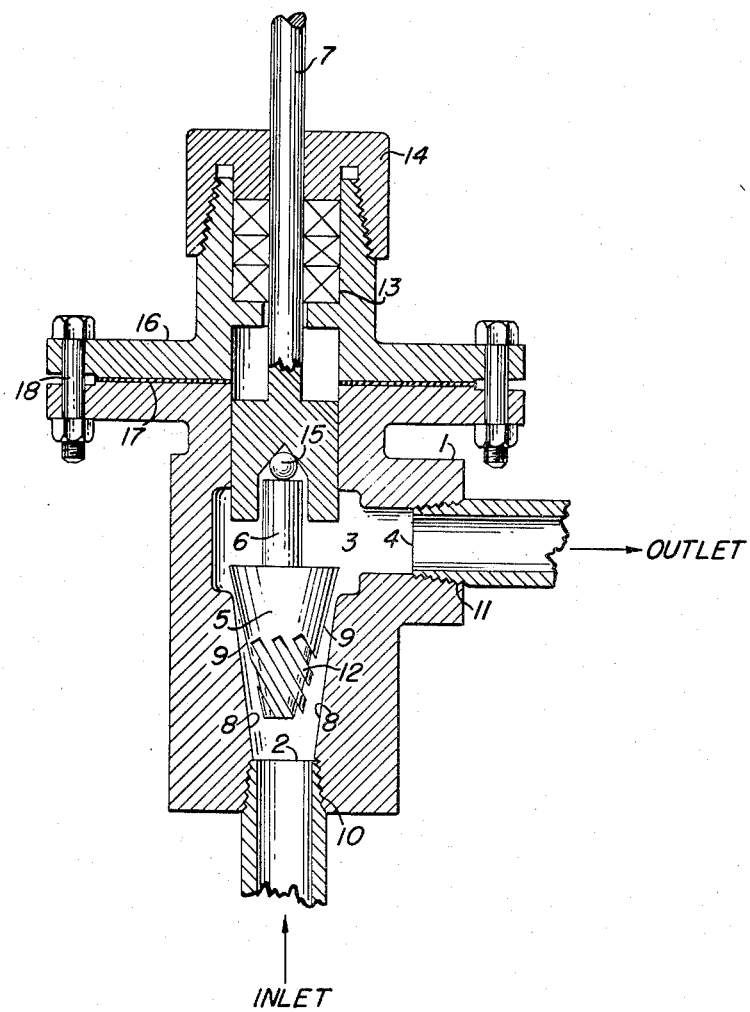

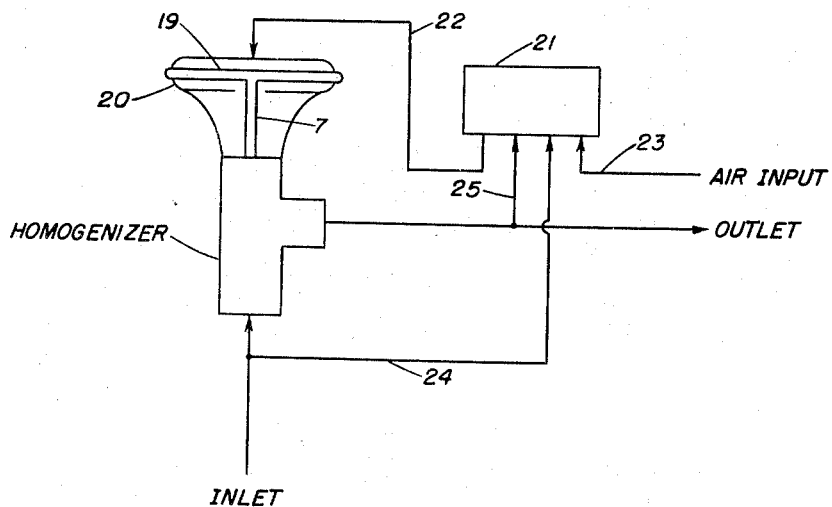

United States Patent Office 2,817,500
Patented Dec. 24, 1957

2,817,500

ADJUSTABLE ORIFICE HOMOGENIZER

James A. Robinson, Stamford, Conn., assignor to American Cyanamid Company, New York, N. Y., a corporation of Maine Application November 5, 1954, Serial No. 467,005

11 Claims. (Cl. 259—4)

This invention relates to homogenizers and more particularly is concerned with a device capable of reducing particles into a smaller particle size. Still more particularly, it relates to a device adapted to produce a narrow size range of particles suspended in a fluid medium.

Homogenizers are generally well known. However, many are not entirely satisfactory. In the prior practice, a narrow particle size range was difficult to achieve. This is because standard homogenizers are so constructed as to permit relatively large particles to pass through the orifice of the homogenizer along with under-sized particles without providing adequate means for obtaining a uniform particle size range.

It is the primary object of the present invention to present a device which will reduce the size of particles suspended in a fluid medium to a certain predetermined narrow size range with a minimum expenditure of both power and facilities for control. Other objects and advantages will become apparent from the description which follows.

To this end, the apparatus of the present invention comprises in combination a casing containing therein a tapered inlet and an outlet. A tapered plug is adapted to be freely positioned in said tapered inlet so that fluids carrying suspended solid particles therein must pass through the circular orifice formed between the inlet and the plug. The taper angle of the inlet is smaller than the taper angle of the plug thereby constricting fluids as they pass through the inlet. Finally, the apparatus possesses means for controlling the position of the tapered plug with respect to the tapered inlet.

The apparatus of my invention may be more fully described with reference to Fig. 1 of the accompanying drawings. In Fig. 1, casing 1 encompasses tapered inlet 2 which leads from the exterior into the chamber 3 in the center of the casing 1. The outlet 4 communicates between the chamber 3 and the exterior. Taper plug 5 is positioned in tapered inlet 2. The stem 6 serves as a means for controlling the position of the tapered plug 5 along the vertical axis of the tapered inlet 2. Attached through a rotary joint to the stem 6 is rod 7 which may be connected to the usual hand-operated valve handle (not shown) or to a reciprocating air motor (not shown). Rod 7 is surrounded by a stuffing box 13 and packing gland 14 in the usual manner. Casing 1 is flanged at 16 and secured by gasket 17 and bolts 18 which permit the homogenizer to be easily assembled or disassembled.

The angle of taper of both the tapered inlet 2 and tapered plug 5 is critical. The angle is the interior angle formed by the surface of the inlet and the plug with a vertical line. As shown in the drawing, the inlet surface 8 has a smaller angle with the vertical than does the plug surface 9. Thus, it can be seen that the plug 5 cannot seat on the tapered inlet 2 in the usual manner in which a plug ordinarily snugly seats itself in the valve seat. This unequal taper of the plug and inlet is essential in the apparatus of the present invention in order that fluid material traveling from the exterior in through the tapered inlet 2 must pass through a zone of diminishing size. Such a zone then constantly increases the velocity of the contained fluid and thus increases the turbulence of the fluid.

Turbulence is of extreme importance in the operation of the homogenizer of the present invention. The reduction in size of the particles carried by the fluid that passes through the homogenizer is accomplished primarily by the turbulent action of the fluid. This action smashes the particles against each other and thus causes a size diminution.

Since the homogenizing action of the apparatus of the present invention is caused almost exclusively by the turbulence of the fluid flowing through the apparatus, it can be seen that the pressure-drop through the apparatus is of paramount importance when the apparatus is in use. The greater the pressure-drop across the apparatus, the greater the turbulence and the greater the degree of homogenization. However, for different materials suspended in fluids, different pressure-drops will be found to yield different degrees of comminution. For any given material, the greater the pressure-drop, the greater the degree of homogenization. Thus the apparatus of the present invention lends itself to the close control of the size of particles passing out of the apparatus simply by controlling the pressure-drop across the apparatus. A pressure-drop maintained at from about 50 to about 4,000 pounds per square inch has been found to be satisfactory in the operation of the apparatus. It must be stressed however that the pressure-drop across the apparatus is the important consideration rather than the absolute pressure applied to the inlet port of the homogenizer. If desired, the outlet 4 of the homogenizer may be maintained at atmospheric pressure or at any desirable pressure above or below atmospheric pressure. In order for the apparatus to operate properly, the pressure of the inlet 2 must always be higher than that on the outlet 4. The threaded openings 10 and 11 respectively merely serve to connect the homogenizer of the present invention with any other apparatus in conjunction with which the homogenizer is to be operated. Although these openings are depicted in the drawing as being at right angles to each other any suitable positioning angle may be utilized. Inlet 10 will, for example, be directly linked to the discharge of a pump and the outlet 11 can be linked to a spray dryer. Alternatively, the outlet and inlet ports may be connected to a standard differential pressure control mechanism if an air motor is employed to regulate the movement of rod 7, as will be more fully described below.

The homogenizing action of the apparatus of the present invention is not primarily due to a crushing or grinding action of the mechanism of the homogenizer. When the apparatus of the present invention is in use, there will always be a gap or an annular orifice between the surface of the tapered inlet 2 and the tapered plug 5. It can be seen then that the particles of a size smaller than this orifice could pass into the chamber 3 without touching any of the homogenizer surfaces and without being subject to grinding or comminution. Nevertheless, due to the turbulence of the fluid in which the particles are suspended, the particles will be dashed one against the other and will be subjected to the extremely powerful forces of turbulent flow and in this fashion will be reduced in size.

As a preferred modification of the homogenizer of the present invention, helical grooves 12 are cut into the lower end of the tapered plug 5. When the entering fluid impinges on the helical grooves 12, it will impart a rotary motion to the tapered plug 5 since stem 6 is mounted so that it rotates on ball 15. With such an arrangement, the tapered plug 5 will rotate constantly during the operation of the homogenizer. Should the fluid carry particles of the size greater than the orifice between the plug 5 and the inlet 2, the rotating plug will then tend to grind down the over-size particles until they can pass through the orifice.

It is an advantage of the present invention that the position of the valve plug may be variously adjusted for purposes of maintaining a predetermined pressure-drop across the apparatus. For example, as shown in Fig. 2, rod 7 is attached directly to a diaphragm 19 of a suitably mounted air motor 20. A conventional differential pressure controller 21 is linked to the motor by way of output signal pressure means 22, comprising suitable tubing through which passes a pressurized inert gas such as air. In the known practice, air under pressure is introduced into the differential pressure controller through lead 23. Any pressure-drop variations across the homogenizer are instantaneously detected in the controller by providing means for input signal pressures as shown in lead 24 (high signal pressure) and lead 25 (low signal pressure), both pressures emanating from the inlet and outlet ports, respectively. These pressures comprise the inlet signal pressure means to the differential pressure controller. In operation, the pressures are transmitted through a hydraulic fluid in leads 24 and 25 as shown. Consequently, should the pressure-drop across the homogenizer increase or decrease, the differential pressure controller will sense the difference in pressure-drop and will emit an output signal pressure (which is proportional to the input signal) to the diaphragm of the air motor. This will reposition the rod and, in turn, will reposition the plug with respect to the seat so as to maintain the desired pressure-drop. When, for example, over-sized particles lodge between the inlet and the plug tending to close the orifice of the homogenizer, partial blockage will occur with resultant higher pressure-drop across the apparatus. This pressure differential will be detected by the controller which instantaneously emits an output signal to the diaphragm of the air motor to motivate rod 7. This causes the raising of the tapered plug 5 (as more particularly shown in Fig. 1) until the orifice is adjusted such that the desired or predetermined pressure-drop is realized. As the blockage is removed due to the attrition of the over-sized particles, the tapered plug will in turn be lowered in the same manner as previously described to readjust to the predetermined differential pressure.

Where the homogenizer of the present invention is operated in conjunction with the differential pressure controller described above, it is preferred that a relatively long taper on the plug be used. With a long taper, the stem travel is relatively great with respect to the resulting change in orifice size between the plug and inlet. Therefore, the tendency of the plug to hunt for a specific pressure-drop will be reduced considerably. This situation results in a narrowing of the turbulence range with a consequent narrowing of the range of particle size produced. It has been found that for best operation the orifice should span a range of from about ¼ of an inch to 2 inches in diameter and that the plug angle should be between about 5 and about 15 degrees with respect to the vertical line described above. Further, the plug angle should be from about 2 degrees to about 5 degrees larger than the seat angle. Although the homogenizer of the present invention can be used wherever a slurry calling for narrow particle size range is useful, it has been found that the homogenizer of the present invention serves particularly well when installed in a line prior to passing a slurry to the spray drying nozzle in standard spray drying procedures. Such an arrangement allows the feeding of a more uniform slurry to the spray drying nozzle and thus produces a more uniform product from the spray drying system.

The homogenizer of the present invention is constructed of any desirable material. The material of construction will depend to some extent on the type of particles to be homogenized and also on the type of fluid in which the particles are suspended. If the fluid is corrosive, then corrosion-resistant materials of construction should be used on those parts of the homogenizer which come in contact with the fluid medium. The homogenizing action is accomplished essentially as previously explained by the turbulence of the fluid medium by the impingement of one particle on the others. Thus, for most purposes, the homogenizer may be fabricated of mild steel so long as the fluid medium will not attack such steel. If the fluid medium is unusually corrosive, then such corrosion-resistant materials as titanium, zirconium, stellite or hastelloy, may be used throughout or may be used as a lining for those parts of the homogenizer that come in contact with the fluid medium. It has been found in practice, however, that a tapered plug and tapered inlet surface fabricated from a ceramic material possess good characteristics of lightness, strength, and corrosion-resistance throughout a wide range of operating conditions.

I claim:

1. A controlled orifice homogenizer comprising in combination: a casing containing therein a tapered inlet and an outlet; a tapered plug adapted to be freely positioned in said tapered inlet, the taper angle of said plug being larger than the taper angle of said inlet; differential pressure means attached to and across the inlet and outlet, adapted to sense variations in pressure drop across the homogenizer; and means for adjusting the position of said plug in accordance therewith to compensate for said variations in differential pressure thereby maintaining a predetermined constant pressure drop across said homogenizer.

2. A controlled orifice homogenizer according to claim 1 wherein said inlet and said outlet are positioned at right angles to each other.

3. A controlled orifice homogenizer according to claim 1 wherein the taper angle of said plug is from about 2 to about 5 degrees larger than the taper angle of said inlet.

4. A controlled orifice homogenizer according to claim 1 wherein said tapered plug and tapered inlet surface are fabricated from a ceramic material.

5. A controlled orifice homogenizer according to claim 1 wherein said tapered plug is adapted to rotate.

6. A controlled orifice homogenizer according to claim 1 wherein said tapered plug possesses helical grooves on the surface thereof.

7. A controlled orifice homogenizer according to claim 1 in which the differential pressure means is a differential pressure controller.

8. A controlled orifice homogenizer comprising in combination: a casing containing therein a tapered inlet; a tapered plug freely positioned in said tapered inlet and having a taper angle larger than that of said inlet; an outlet in said casing; a chamber positioned between said inlet and said outlet; differential pressure means attached to and across the inlet and outlet, adapted to sense variations in pressure drop across the homogenizer; and means for adjusting the position of said plug in accordance therewith to compensate for said variations in differential pressure thereby maintaining a predetermined constant pressure drop across said homogenizer.

9. A controlled orifice homogenizer according to claim 8 wherein said plug possesses helical grooves on the lower surface thereof.

10. A controlled orifice homogenizer comprising in combination: a casing containing therein a tapered inlet; a tapered plug freely positioned within said inlet, the taper angle of said plug being greater than that of the taper angle of said inlet; a stem mounted on said plug; an outlet in said casing; a chamber positioned between said inlet and said outlet; differential pressure means attached to and across the inlet and outlet, adapted to sense variations in pressure drop across the homogenizer; and means for adjusting the position of said plug in accordance therewith to compensate for said variations in differential pressure thereby maintaining a predetermined constant pressure drop across said homogenizer.

11. A controlled orifice homogenizer according to claim 10 wherein said tapered plug possesses helical grooves on the lower surface thereof.

References Cited in the file of this patent

UNITED STATES PATENTS

| | | |
|---|---|---|
| 1,393,632 | Mitchell | Oct. 11, 1921 |
| 1,795,226 | MacKenzie | Mar. 3, 1931 |